United States Patent [19]

Kopeček et al.

[11] 4,062,831

[45] Dec. 13, 1977

[54] COPOLYMERS BASED ON N-SUBSTITUTED ACRYLAMIDES, N-SUBSTITUTED METHACRYLAMIDES AND N,N-DISUBSTITUTED ACRYLAMIDES AND THE METHOD OF THEIR MANUFACTURING

[75] Inventors: Jinřich Kopeček; Karel Ulbrich; Jiří Vacík; Jiří Strohalm; Vladimír Chytrý; Jaroslav Drobník; Jaroslav Kálal, all of Prague, Czechoslovakia

[73] Assignee: Ceskoslovenska akademie ved, Prague, Czechoslovakia

[21] Appl. No.: 568,777

[22] Filed: Apr. 17, 1975

[30] Foreign Application Priority Data

Apr. 23, 1974 Czechoslovakia .................. 2879/74

[51] Int. Cl.$^2$ ..................... C08F 222/12; C08J 5/20; C08G 69/44; C08G 73/16
[52] U.S. Cl. ......................... 260/47 UA; 260/201 K; 260/78 A; 260/78 UA; 260/78.3 UA; 260/79.3 M; 424/81; 526/208; 526/218; 526/230; 526/258; 526/304
[58] Field of Search ... 260/47 UA, 79.3 M, 78.3 UA, 260/78 A, 78 UA; 526/304, 258

[56] References Cited

PUBLICATIONS

Chem. Abs. vol. 79, 08, 032341J, Kozai "Polymerization of Methacryloyl Glycine in Aq. Sol. initiated, by Ammonium Persulfate".

Chem. Abs. vol. 80, 10, 048568V, Watanabe et al., "Regulating Method for Limiting Viscosity of Polymer".

*Primary Examiner*—Herbert J. Lilling

[57] ABSTRACT

The invention relates to copolymers based on N-substituted acrylamides, N-substituted methacrylamides and N,N-disubstituted acrylamides and to a method for their manufacturing, which copolymers are prepared under conditions when the phase separation takes place. The resulting copolymer contains reactive groups and serves as the intermediate for preparation of biologically active compounds (enzymes, hormones, drugs, etc.) bonded to the polymer. The procedure according to the invention enables to prepare porous polymers suitable as separation barriers (membranes) or column packings for gel or affinity chromatography, if the polymerization is carried out in the presence of a divinyl component.

5 Claims, No Drawings

COPOLYMERS BASED ON N-SUBSTITUTED ACRYLAMIDES, N-SUBSTITUTED METHACRYLAMIDES AND N,N-DISUBSTITUTED ACRYLAMIDES AND THE METHOD OF THEIR MANUFACTURING

The invention relates to copolymers based on N-substituted acrylamides, N-substituted methacrylamides and N,N-disubstituted acrylamides and to the method for their manufacturing under conditions when a phase separation takes place. The resulting copolymer contains reactive groups and serves as an intermediate for preparation of biologically active compounds (enzymes, hormones, drugs, etc.) bonded to the polymer. If the polymerization is carried out in the presence of a divinylic component, the procedure according to the invention enables the preparation of porous polymers suitable as separation barriers (membranes) or as packings for columns for gel or affinity chromatography.

Soluble homopolymers and copolymers of N-monosubstituted methacrylamides, N-monosubstituted acrylamides, N,N-disubstituted acrylamides as well as their copolymers are known, which are useful, for instance, as a substitute of blood plasma, Czechoslovak patent application No. 3992-70 and Czechoslovak Pat. No. 159,937 corresponding to U.S. continuation-in-part Ser. No. 453,082, now U.S. Pat. No. 3,893,322 U.S. Ser. No. 335,748 and U.S. divisional Ser. No. 464,033). One of the most important characteristics for this application and also for technological applications is the molecular weight distribution of the given polymer. The procedures for preparation of the above mentioned polymers used till the present time employed a solution polymerization or copolymerization followed by separation of the polymer in a excess of a precipitant. A suitable molecular weight distribution was then achieved by the repeated solution of the separated polymer and its fractional precipitation. This method, which is suitable for small-scale preparation, is insuitable for handling large amounts of the polymer.

If a divinylic compound is used as a copolymerization component, a three-dimensional polymer is formed which may be used either in medicine or for separation processes (Czechoslovak Pat. Nos. 147,113; 147,152; 149,376 and 154,386 corresponding to U.S. continuation-in-part Nos. 314,213; 363,153; 281,283 now U.S. Pat. Nos. 3,876,594 and 235,427.

Application of copolymers based on acrylamides for stabilization of soils is described in the U.S. Pat. No. 2,827,397. Usage of these copolymers for impregnation of concrete or brickwork surfaces is described in the U.S. Pat. No. 2,827,397. Copolymers of N-methylolacrylamide are described in the U.S. Pat. No. 2,680,110. The preparation of polymers based on N-(3-hydroxyalkyl)acrylamides is described in the U.S. Pat. No. 3,531,525 and copolymers containing the N-methylcarbamoyl radical are described in the U.S. Pat. No. 3,314,909.

A disadvantage of procedures which comprise the copolymerization carried out in the presence of a solvent consists in the formation of homogeneously cross-linked gels, the transport properties of which may be varied only by changing the content of the divinylic component, i.e. by the crosslinking density of the resulting polymer. This fact unfavourably affects the application of the aforesaid materials both in medicine, where the transport of metabolites cannot be modified in a broad region, and in the membrane and chromatographic separation processes, where the choice of penetrating compounds is limited to the compounds having the low molecular weight.

Further problem observed in the solution copolymerization of these compounds is the minimum yield in copolymerization of N-substituted methacrylamides or acrylamides with the comonomers which carry an activating group, e.g. with nitrophenyl esters of methacryloyl(glycyl)$_n$glycine, where $n = 0-4$. Consequently, it was impossible to prepare both soluble and three-dimensional activated copolymers suitable for bonding of biologically active compounds by the procedures known until now.

This invention relates to copolymers consisting of 39.9 to 99.9 molar percent of units of the general formula A, formed by basic monomers — N-substituted acrylamides, N-substituted methacrylamides and N,N-disubstituted acrylamides,

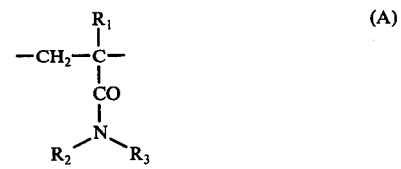

where
$R_1$ is H or $CH_3$,
$R_2$ is alkyl or alkoxyalkyl having one to six carbon atoms and none to three OH groups in the chain,
while $R_3$ is H or $R_2$, if $R_1$ is H and $R_3$ is H, if $R_1$ is $CH_3$, 0.1 to 50 molar percent of units X formed by copolymerization of monomers selected from the group comprising

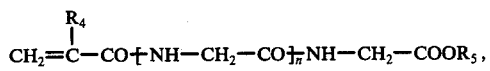

where $R_4$ is H or $CH_3$, $R_5$ is a residue of p-nitrophenol, 2,3,5-trichlorophenol, 8-hydroxyquinoline, N-hydroxysuccinimide, N-hydroxyphthalimide and $n = 0 - 4$;

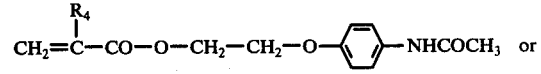

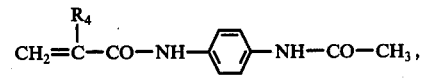

where the substitutents $R_4$ and $R_5$ have the above mentioned meaning, and 0 to 60 molar percent of units Z, formed by copolymerization of a divinylic compound selected from the group comprising bis-acrylamides, bis-methacrylamides, bis-acrylates, ethylene glycol dimethacrylate, diethylene glycol dimethacrylate, 1,4-cyclohexyldimethyl dimethacrylate, 1,6-hexamethylene-bis-acrylamide, 1,6-hexamethylene dimethacrylate, N,N'-methylene-bis-acrylamide, N,N'-ethylene-bis-methacrylamide, tetraethylene glycol diacrylate, 1,1,1-trimethylolethane trimethacrylate, 1,1,1-trimethylolpropane triacrylate, 1,1,1-trimethylolpropane trimethacrylate, diisopropylene glycol dimethacrylate, ethylidene diacrylate, ethylidene dimethacrylate, divinylsulfone, or triacryloylperhydrotriazine.

A part of the basic monomer may be substituted in the copolymer by a monomer containing the group $CH_2=C<$, for example by 2-hydroxyethyl methacrylate, diethylene glycol monomethacrylate, triethylene glycol monomethacrylate, acrylonitrile, methacrylonitrile, N,N-disubstituted methacrylamides, methacrylic esters, methacrylic acid, acrylic acid, diethylaminoethyl methacrylate, N-vinylpyrrolidone, and the like. The copolymer may be advantageously prepared by copolymerization of N-(2-hydroxypropyl)methacrylamide as the basic monomer with

(forming the X units), where the substituents $R_4$ and $R_5$ have the above given meaning, and either none monomer forming the Z units, or with methylene-bis-acrylamide or ethylene dimethacrylate as monomers forming the Z units. N-(2-Hydroxypropyl)methacrylamide can be also used as the basic monomer and copolymerized with

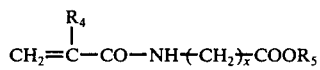

and ethylene dimethacrylate which provide the X and Z units, respectively.

The essential feature of the invention is the fact, that the resulting copolymer contains units which carry reactive groups able to bind biologically active compounds. As follows from the structure of the above mentioned compounds, the choice of $n$ or $x$ allows to achieve various distances of the active group from the copolymer surface and to affect the ease of the reaction between the active group and a biologically active compound as well as the reactivity of the bonded biologically active compound in this way.

However, it is possible to carry out a reaction of a biologically active compound with the reactive monomeric compound and to prepare, for example, pharmaceuticals or a substrate in the monomeric form in this way, which is then transferred into a final applicable form by the copolymerization process.

A method for preparation of the above mentioned copolymers consists in the radical polymerization of the mixture of compounds in the presence of an initiator and in 2 to 75 percent solution in a low-molecular-weight compound (the precipitant), while the interaction parameter copolymer — the low-molecular-weight compound is higher than 0.6 at the temperature $-10°$ to $100°$ C.

Another feature of the method for manufacturing of the aforesaid copolymers according to this invention is that the polymerization is carried out in the presence of 0 to 60 molar percent, preferably up to 50 molar percent, of a divinyl compound, as for example, bis-methacrylates, bis-acrylates, bis-acrylamides and bis-methacrylamides, etc.

The polymerization or copolymerization may be also carried out in an oil or aqueous suspension.

If the polymerization or copolymerization is carried out in a suspension, e.g. by the method described in the Czechoslovak Pat. Nos. 131,449 and 148,828 (U.S. continuation-in-part Ser. No. 359,185) or in the Czechoslovak Pat. No. 150,819 (U.S. continuation-in-part Ser. No. 281,288), this condition holds for the composition of dispersed monomeric droplets.

The polymer precipitates during the entire course of copolymerization in the case of N-substituted methacrylamides or acrylamides copolymerized in the absence of the divinyl component. The resulting polymer has a narrow distribution curve of molecular weight and can be therefore used for bonding of a biologically active compound as a polymeric drug.

If the copolymerization is carried out in the presence of the divinyl component, three-dimensional heterogeneous polymers or copolymers are formed according to the ratio of starting components, the porosity of which may be varied within broad limits either by changing the ratio of copolymerized compounds or by changing the low-molecular-weight compound (i.e. precipitant) - to - monomer mixture ratio. The polymers which have various uses may be prepared in this way. Thus, for example, the polymers suitable as implants with various intensity and velocity of penetration of the new-formed tissue or a separation barrier can be prepared in the form of membranes by polymerization between two plates with inserted spacer.

Packings for chromatographic columns may be prepared either by disintegration of a properly dried (e.g. lyophilized) polymer prepared by the aforesaid procedure or by suspension polymerization described, for example, in the Czechoslovak Pat. Nos. 131,444; 148,828 or 150,819. In all above mentioned cases, the basic monomer is N-alkylmethacrylamide, N-alkylacrylamide and N,N-dialkylacrylamide, where alkyl contains 1 to 6 carbon atoms and may contain 0 to 3 OH-groups, or combinations of these monomers.

A part of the basic monomer, advantageously below 25 molar percent, may be replaced with another comonomer which contains the group $CH_2=C<$, for example with 2-hydroxyethyl methacrylate, diethylene glycol monomethacrylate, triethylene glycol monomethacrylate, acrylonitrile, methacrylonitrile, N,N-disubstituted methacrylamides, methacrylic esters, methacrylic acid, acrylic acid, diethylaminoethyl methacrylate, N-vinylpyrrolidone, and the like.

Acetone, toluene, acetonitrile, hexane, diethylether, dibutylether, dioxane, a mixture of dodecyl alcohol - cyclohexanol, etc., may be advantageously used as low-molecular-weight compounds (precipitants), which cause phase separation in the course of polymerization or copolymerization.

Common initiators of the free-radical polymerization can be used, i.e. azo compounds, diacylperoxides, or known redox initiators, e.g. the system tertiary amine - dibenzoyl peroxide, and the like, especially if easily decomposing compounds or compounds reacting with the OH-group of hydroxyalkyl bonded to the amidic nitrogen of the comonomer at higher temperatures are copolymerized. The polymerization is carried out at the temperature $-10°$ to $100°$ C.

If the polymerization is carried out in an oil suspension, paraffin oil, castor oil or silicone oil may be advantageously used.

The objective of the invention is further illustrated in examples, without, however, limiting the scope of the invention by any means.

EXAMPLE 1

A glass ampoule is charged with 3 g of N-(2-hydroxypropyl)-methacrylamide, 0.35 g of nitrophenyl N-methacryloylglycylglycinate, 0.34 g of azobisisobutyronitrile and 35.5 g of acetone. The mixture was bubbled through with nitrogen to remove the dissolved oxygen, sealed and polymerized at 50° C. The precipitated polymer is separated on a fritted-glass filter after 8 hours, washed with acetone and dried. The yield is 72%. The content of nitrophenyl N-methacryloylglycylglycinate in the monomer mixture is 5.0 mol. % and in the polymer 5.3 mol. % according to the UV spectrometric analysis.

EXAMPLE 2

A reference example carried out by the solution polymerization shows that it is impossible to prepare the copolymer given in Example 1 by the common procedure.

A glass ampoule was charged with 6 g of N-(2-hydroxypropyl)-methacrylamide, 0.71 g of nitrophenyl N-methacryloylglycylglycinate, 0.10 g of azobisisobutyronitrile and 18 g of dimethylformamide. The mixture was bubbled through with nitrogen to remove the dissolved oxygen, sealed and polymerized for 16 hours at 60° C. On completion of the polymerization, the polymer was precipitated in an excess of acetone, filtered on a fritted-glass filter and dried. The yield was 1 wt. % related to the monomer mixture, i.e. 70 times less than in the procedure according to this invention.

EXAMPLE 3

A glass ampoule was charged with 3 g of N-(2-hydroxypropyl)-methacrylamide, 0.5 g of p-acetaminophenylmethacrylamide, 0.3 g of dibenzoyl peroxide, 0.2 g of triethanolamine and 50 g of acetone. The mixture was bubbled through with nitrogen, then sealed and polymerized for 24 hours at 10° C. The precipitated polymer was separated on a fritted-glass filter, dissolved in methanol and reprecipitated into acetone. The yield was 68%.

EXAMPLE 4

An ampoule was charged with 5 g of N-(2-hydroxypropyl)methacrylamide, 0.3 g of N-methacryloyl ε-aminocaproate of N-hydroxysuccinimide, 0.2 ml of diisopropyl peroxocarbonate and 50 g of acetone. The mixture was polymerized for 16 hours at 40° C. The resulting polymer was filtered, washed and dried and it is suitable for bonding of biologically active compounds which contain amino groups.

EXAMPLE 5

The mixture consisting of 30 g of N-(2-hydroxypropyl)methacrylamide, 4.2 g of azobis(methyl isobutyrate), 3.5 g of nitrophenyl N-methacryloyldiglycylglycinate and 450 ml of acetone was polymerized for 12 hours at 60° C in a sealed glass ampoule. The yield was 70.8%.

EXAMPLE 6

A glass mold was charged with 2 g of N-(2-hydroxypropyl)methacrylamide, 0.5 g of nitrophenyl N-methacryloyl ε-aminocaproate, 0.2 g of ethylene dimethacrylate, 0.1 g of azobisisobutyronitrile and 8 g of acetone. The mixture was bubbled through with nitrogen, sealed in a mold and polymerized at 50° C for 6 hours. A macroporous spongeous threedimensionally crosslinked copolymer is formed.

EXAMPLE 7

A separation barrier in the form of a membrane may be prepared by the procedure analogous to Example 4 with the distinction that N-ethylmethacrylamide is used instead of N-(2-hydroxypropyl)methacrylamide and the polymerization is carried out between two plan--parallel polypropylene plates.

EXAMPLE 8

The mixture consisting of 1 g of N,N-diethylacrylamide, 0.25 g of methacryloylglycylglycylglycine, 0.1 g of dibenzoyl peroxide, 0.1 g of triethylamine, 2 g of hexane, and 2 g of diethylether is polymerized for 10 hours at 25° C. The resulting polymer is filtered and dried. Carboxylic groups of the polymer are then transformed into nitrophenyl ester by the polymeranalogous reaction with nitrophenol in the presence of dicyclohexylcarbodiimide. The copolymer which is modified in this way is activated and suitable for the reaction with biologically active compounds.

EXAMPLE 9

The mixture consisting of 10 g of N-ethylacrylamide, 1 g of N-butylacrylamide, 1 g of the ester of N-methacryloyl-Ω-aminopelargonic acid and N-hydroxysuccinimide, 3 g of tetraethylene glycol dimethacrylate, 0.7 g of diisopropyl peroxocarbonate and 50 g of dibutylether is polymerized between two polypropylene plates under an inert atmosphere at 45° C for 12 hours. The resulting membrane is suitable for bonding of the biologically active compounds.

EXAMPLE 10

The mixture consisting of 5 g of N-(2-hydroxypropyl)methacrylamide, 1 g of N-propylmethacrylamide, 1 g of N,N-dimethylmethacrylamide, 6 g of acetaminophenoxyethyl acrylate, 5 g of trimethylolpropane trimethacrylate, 35 g of acetone and 0.65 g of diisopropyl peroxocarbonate is polymerized under an inert atmosphere in a glass mold for 10 hours at 55° C. A macroporous copolymer is obtained.

EXAMPLE 11

The material prepared according to Example 8 is washed with ethanol, dried and disintegrated. The polymer is screened and the fraction 20 – 40 μ is used as the packing of chromatographic columns.

EXAMPLE 12

A three-necked flask equipped with a high-speed stirrer is charged with 9 g of N-(2-hydroxypropyl)methacrylamide, 10 g of acetaminophenylmethacrylamide, 1 g of trimethylolpropane trimethacrylate, 0.2 g of diisopropyl peroxocarbonate and 190 ml of toluene and the mixture is polymerized for 2 hrs at 80° C. The resulting polymer has a form of fine globular particles of the diameter 20 μ. The polymer is filtered, washed on a fritted-glass filter with acetone, dried and sieved giving the suitable chromatographic material for affinity chromatography.

EXAMPLE 13

The mixture of 8 g of N-(2-hydroxypropyl)methacrylamide, 0.06 g of the ester of N-methacryloyl Ω-aminopelargonic acid and N-hydroxysuccinimide, 1 g of tetraethylene glycol dimethacrylate, 0.2 g of diisopropyl peroxocarbonate and 190 ml of toluene is polymerized in the same way as it is described in Example 12. The resulting polymer is the suitable packing for gas chromatography.

EXAMPLE 14

The mixture of 8 g of N-(2-hydroxypropyl)methacrylamide, 0.8 g of nitrophenyl methacryloylglycinate, 1 g of trimethylolpropane trimethacrylate, 0.2 g of diisopropyl peroxocarbonate and 180 ml of toluene is polymerized by the procedure described in Example 12. The activated copolymer results which is suitable for bonding of biologically active compounds.

EXAMPLE 15

The mixture of 600 ml of paraffine oil, 7 g of poly(cetyl methacrylate), 2 g of azobis(methyl isobutyrate), 140 g of N-(2-hydroxypropyl)methacrylamide, 30 g of the ester of methacryloyltriglycylglycine and 8-hydroxyquinoline and 10 g of triethylene glycol dimethacrylate is heated to 80° C under an inert atmosphere and vigorous stirring for 4 hrs. The resulting polymer is filtered, washed with acetone and ether and dried. Globular particles are obtained of the size 30 – 70 $\mu$ which are suitable for packing of chromatographic columns.

EXAMPLE 16

The mixture consisting of 600 ml of paraffine oil, 7 g of poly(cetyl methacrylate), 2 g of azobis(methyl isobutyrate), 140 g of N-ethylacrylamide, 40 g of the ester of N-methacryloyl -aminobutyric acid with N-hydroxyphthalimide and 12 g of diethylene glycol dimethacrylate is polymerized by the procedure described in Example 15. A weak-acidic cation exchanger is obtained.

EXAMPLE 17

The mixture consisting of 50 wt. parts of N,N-diethylacrylamide, 20 wt. parts of acrylonitrile, 20 wt. parts of 2,3,5-trichlorophenyl methacryloyl-ϵ-aminocaproate, 30 wt. parts of diethylene glycol dimethacrylate, 100 wt. parts of cyclohexanol, 10 wt. parts of dodecanol, 2 wt. parts of diisopropyl peroxocarbonate, 600 wt. parts of water and 6 wt. parts of polyvinylpyrrolidone is polymerized at 60° C for 5 hours under vigorous stirring. The obtained suspension copolymer is filtered off, washed with methanol, dried and screen-fractioned. Individual fractions are used as packings of chromatographic columns.

EXAMPLE 18

The mixture consisting of 45 wt. parts of N-ethylacrylamide, 10 wt. parts of nitrophenyl methacryloyltetraglycylglycinate, 25 wt. parts of methylene-bis-acrylamide, 100 wt. parts of cyclohexanol, 10 wt. parts of dodecanol, 2 wt. parts of azobisisobutyronitrile, 600 wt. parts of water and 6 wt. parts of polyvinylpyrrolidone is polymerized by the procedure described in Example 17.

EXAMPLE 19

The polymerization is carried out analogously as in Example 18, with the distinction that 15 wt. parts of N-ethylacrylamide are replaced by 20 wt. parts of butyl methacrylate.

EXAMPLE 20

The polymerization is carried out analogously as in Example 4, with the distinction that 1 g of N-(2-hydroxypropyl)methacrylamide is replaced with triethylene glycol monomethacrylate.

EXAMPLE 21

The polymerization is carried out analogously as in Example 17, with the distinction that acrylonitrile is replaced by 2-hydroxyethyl methacrylate.

EXAMPLE 22

The polymerization is carried out analogously as in Example 17, with the distinction that acrylonitrile is replaced by N,N-dimethylmethacrylamide.

EXAMPLE 23

The mixture consisting of 20 g of N-(2-hydroxypropyl)methacrylamide, 9 g of triethylene glycol monomethacrylate, 4 g of azobisisobutyronitrile, 3.5 g of nitrophenyl methacryloyldiglycylglycinate and 450 ml of acetone was placed in an ampoule, bubbled through with nitrogen, sealed and polymerized for 12 hours at 55° C. The resulting polymer, after filtration, washing and drying, is suitable for bonding of biologically active compounds which contain amino groups.

EXAMPLE 24

The mixture consisting of 50 wt. parts of N-(2-hydroxypropyl)methacrylamide, 18 wt. parts of methacrylonitrile, 20 wt. parts of 2,3,5-trichlorophenyl methacryloyl-$\mu$-aminocaproate, 30 wt. parts of methylene-bis-acrylamide, 100 wt. parts of cyclohexanol, 10 wt. parts of dodecanol, 4 wt. parts of diisopropyl peroxocarbonate, 600 wt. parts of water and 6 wt. parts of polyvinylpyrrolidone is polymerized for 6 hours at 40° C under vigorous stirring. The resulting suspension copolymer is filtered off, washed with acetone, dried and screen-fractionated.

EXAMPLE 25

The polymerization is carried out analogously as in Example 24, with the distinction that methylene-bis-acrylamide is replaced by ethylene dimethacrylate.

EXAMPLE 26

The mixture consisting of 600 ml of paraffine oil, 7 g of polyvinylpyrrolidone, 3 g of azobisisobutyronitrile, 57 g of N-(2-hydroxypropyl)methacrylamide, 0.5 g of nitrophenyl methacryloylglycylglycinate and 118 g of ethylene dimethacrylate is polymerized by the procedure described in Example 15.

The materials according to the invention are suitable as soluble or insoluble intermediates for bonding of biologically active compounds. They may be used as solutions, in the form of a membrane or as globular particles for packings of chromatographic columns.

We claim:
1. A copolymer consisting of:
    1. 39.9 to 99.9 molar percent of a first monomeric component consisting of:
        a. 100 to 75 molar percent of a monomer comprising an N-monosubstituted acrylamide or methacrylamide or an N,N-disubstituted methacrylamide, each N-substituent being an alkyl or an alkyloxyalkyl group having 1 to 6 carbon atoms and 0 to 3 hydroxy groups; and b. 0 to 25 molar percent of a monovinylic monomer other than (a); and 2. a minor molar percent proportion of a second monomeric component having the general formula:

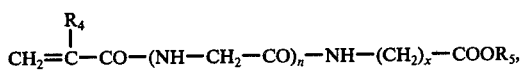

wherein:
$R_4$ is H or $CH_3$;
$R_5$ is the radical form of p-nitrophenol, 2,3,5-trichlorophenol, 8-hydroxyquinoline, N-hydroxysuccinimide, or N-hydroxyphthalimide;
$n$ is 0 to 4; and
$x$ is 1 to 10.

2. A copolymer according to claim 1, in which, in the formula of the second monomeric component, $x$ is 1.

3. A copolymer according to claim 1, in which monomer (a) of the first monomeric component comprises N-(2-hydroxypropyl) methacrylamide.

4. A copolymer according to claim 1, in which the monovinylic monomer (b) of the first monomeric component comprises 2-hydroxyethyl methacrylate.

5. A method of producing a copolymer according to claim 1, which comprises copolymerizing the monomeric components by means of free-radical polymerization in a 2 – 75% solution of a low-molecular-weight precipitant, the interaction parameter polymer - low-molecular-weight precipitant being higher than 0.6, at a temperature of −10° to 100° C.

* * * * *